United States Patent
Kao (12)

(10) Patent No.: US 6,789,145 B2
(45) Date of Patent: Sep. 7, 2004

(54) INTERFACE FOR MICROPROCESSORS AND NETWORK FACILITIES

(75) Inventor: Jesse Kao, Hsin Chuang (TW)

(73) Assignee: Global Sun Technology Inc., Taipei (TW)

( * ) Notice: Subject to any disclaimer, the term of this patent is extended or adjusted under 35 U.S.C. 154(b) by 183 days.

(21) Appl. No.: 10/260,456

(22) Filed: Sep. 26, 2002

(65) Prior Publication Data

US 2004/0063421 A1 Apr. 1, 2004

(51) Int. Cl.[7] .................................................. G06F 3/00
(52) U.S. Cl. ................................ 710/62; 710/3; 710/4; 709/250
(58) Field of Search ............................. 710/3, 4, 62, 72; 709/250

(56) References Cited

U.S. PATENT DOCUMENTS

| 6,404,393 B1 | * | 6/2002 | Nelson et al. | 343/702 |
| 2002/0045435 A1 | * | 4/2002 | Fantaske | 455/403 |
| 2003/0078065 A1 | * | 4/2003 | Nelson et al. | 455/517 |

* cited by examiner

Primary Examiner—Jeffrey Gaffin
Assistant Examiner—Alan Chen

(57) ABSTRACT

A network facility includes an interface device coupled between a processor member and a network device which has an integrated circuit coupled between an antenna and the interface device. The interface device has a chip selecting member coupled to the integrated circuit for accessing to the integrated circuit, and a reading and a writing control members coupled to the integrated circuit for reading and writing between the integrated circuit and the processor member. The interface device may have a waiting or a reset or an interrupting member coupled to the integrated circuit.

4 Claims, 3 Drawing Sheets

INTERFACE FOR MICROPROCESSORS AND NETWORK FACILITIES

BACKGROUND OF THE INVENTION

1. Field of the Invention

The present invention relates to an interface device, and more particularly to an interface device for coupling processor or microprocessor control units to network systems or facilities.

2. Description of the Prior Art

Typical network systems or facilities, such as the local area network (LAN) facilities, the wireless local area network (WLAN) facilities, the peripheral component interconnect (PCI) interface devices, the universal serial bus (USB) interface devices, etc., may include one or more radio frequency (RF) antennas for telecommunication purposes.

The typical network systems or facilities may further include an integrated circuit or a chip provided therein and coupled to the antennas for processing the data or signals or information. One example of the integrated circuits or chips is the ACX100 series integrated circuits manufactured by Texas Instruments Incorporated.

In addition to the ACX100 series integrated circuits, the typical network systems or facilities further include a central processor unit (CPU), or a microprocessor control unit (MCU) provided therein and coupled to the integrated circuit or chip, for processing or transmitting the data or signals or information.

However, various kinds of MCUs that may be obtained from the market are manufactured and sold by various or different companies, such as the X86 series MCUs, the ARM series MCUs manufactured by ARM Inc. at Los Gatos, Calif., the MIPS series MCUs manufactured by ARM Inc. at Mountain View, Calif.

The MCUs normally may not be directly coupled together, or are not compatible with each other, such that additional coupling or connecting circuits or facilities are further required to be provided and coupled between the MCUs and the ACX100 series integrated circuits, for allowing the LAN or WLAN to be workable.

In addition, the antennas, the ACX100 series integrated circuits, the MCUs, and the additional coupling or connecting circuits or facilities are solidly disposed in a single housing and coupled together, and should all be discarded when either of the ACX100 series integrated circuits, the MCUs, or the additional coupling or connecting circuits or facilities has been damaged. It may cost a lot of money or fee to repair or to maintain the elements of the LAN or WLAN facilities.

The present invention has arisen to mitigate and/or obviate the afore-described disadvantages of the conventional interface devices.

SUMMARY OF THE INVENTION

The primary objective of the present invention is to provide an interface device for coupling processor or microprocessor control units to network systems or facilities.

The other objective of the present invention is to provide an interface device for reducing the maintenance fee for the MCUs, and the integrated circuits.

In accordance with one aspect of the invention, there is provided a network facility comprising a processor unit including a data bus and an address bus, an interface device including a data unit and an address unit coupled to the data bus and the address bus of the processor unit respectively, and a network device including an antenna, and an integrated circuit coupled to the antenna and coupled to the interface device. The interface device may include a chip selecting unit coupled to the integrated circuit of the network device, for accessing to the integrated circuit of the network device, and for allowing the processor unit to send chip selecting signals to the integrated circuit of the network device. The interface device may further include a writing control unit coupled to the integrated circuit of the network device, for allowing the integrated circuit of the network device to send out signals to the processor unit via the interface device. The interface device may further include a reading control unit coupled to the integrated circuit of the network device, for allowing the processor unit to send out signals to the integrated circuit of the network device via the interface device.

The interface device further includes a waiting unit coupled to the integrated circuit of the network device, for sending waiting control signals to the processor unit, and for controlling the processor unit in a waiting state, when data or information communication between the integrated circuit of the network device and the processor unit is busy.

The interface device further includes a reset unit coupled to the integrated circuit of the network device, for sending resetting signals to the processor unit, and for allowing the processor unit to send chip selecting signals to the integrated circuit of the network device again.

The interface device further includes an interrupting unit coupled to the integrated circuit of the network device, for sending interrupting signals to the processor unit, and for interrupting the processor unit.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
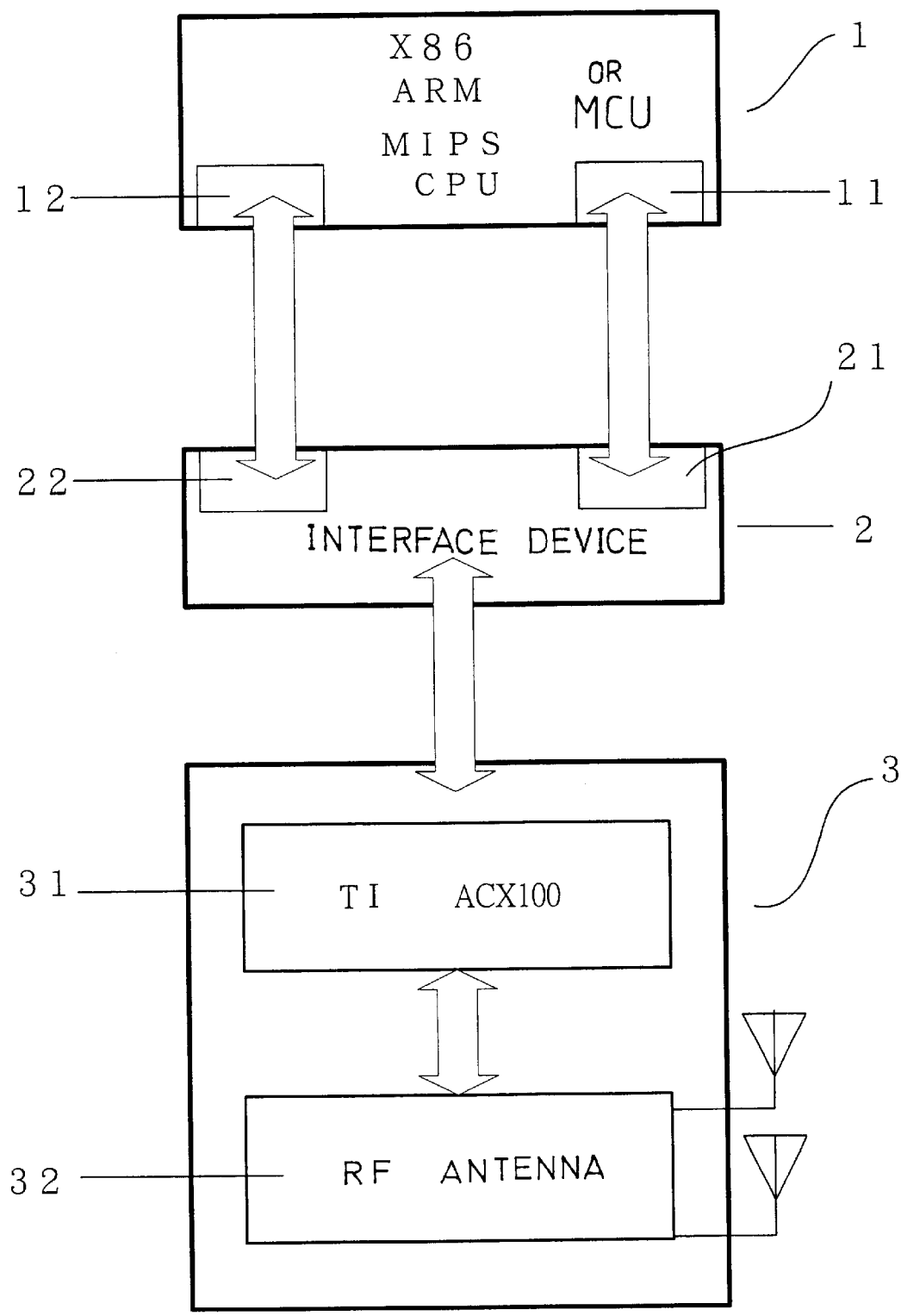
FIG. 1 is a block diagram illustrating an interface device in accordance with the present invention for coupling between the CPU or MCU and a LAN or WLAN facility.
Figure 2:
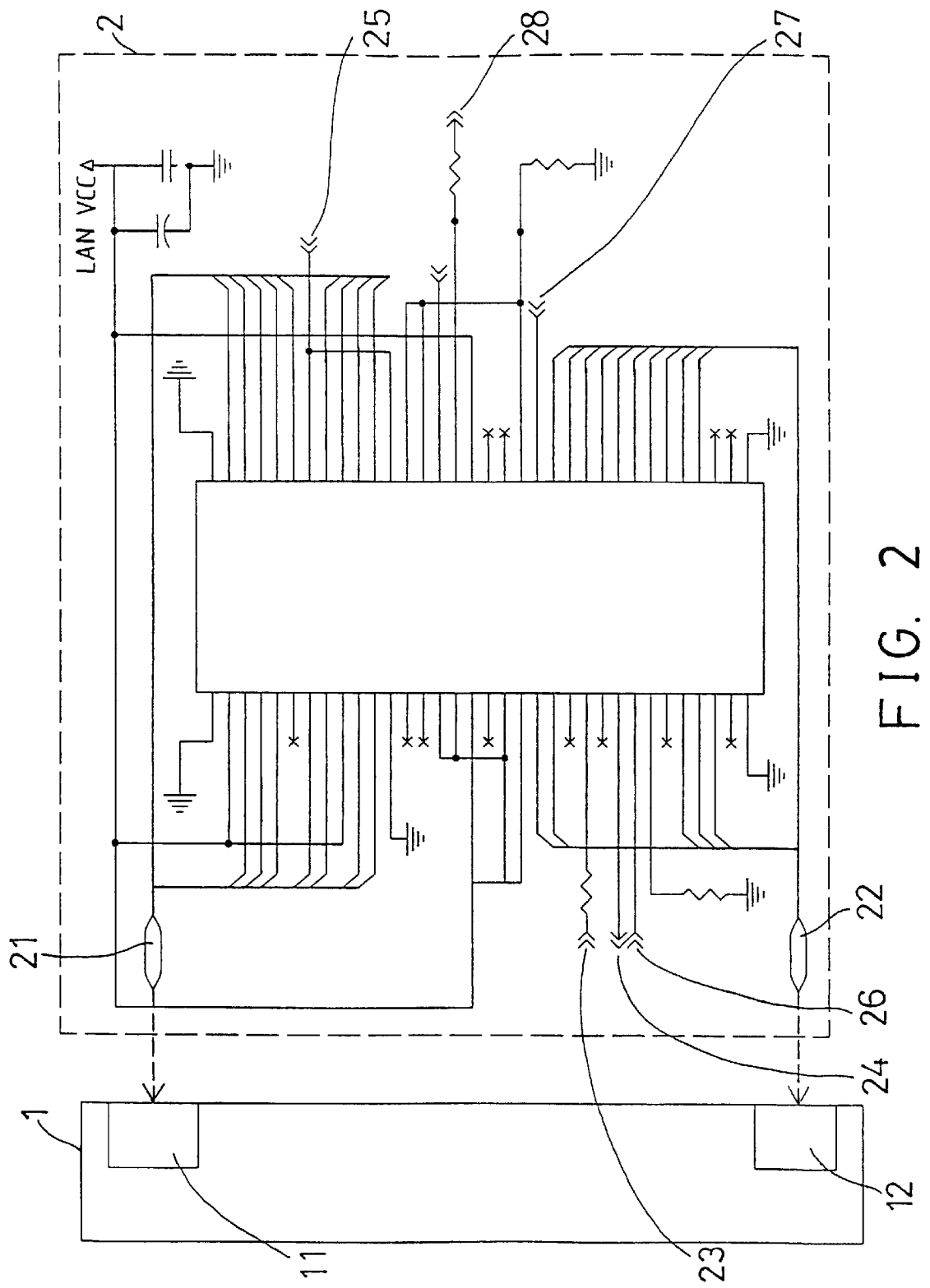
FIG. 2 is a plan schematic view illustrating the circuit of the interface device.

Referring to the drawings, and initially to FIGS. 1 and 2, an interface device in accordance with the present invention is generally indicated with a reference numeral "2" and is to be coupled between a CPU or MCU 1 and a LAN or WLAN or network device 3.

The CPU or MCU 1 may also be obtained from various companies, such as the X86 series MCUs, the ARM series MCUs manufactured by ARM Inc. at Los Gatos, Calif., or the MIPS series MCUs manufactured by ARM Inc. at Mountain View, Calif., and may include a data bus 11 and an address bus 12 provided therein.

The interface device 2 in accordance with the present invention comprises a data unit 21 and an address unit 22 provided therein, and coupled to the CPU or MCU 1 with the data bus 11 and the address bus 12, or coupled to the data bus 11 and the address bus 12 of the CPU or MCU 1.

The LAN or WLAN or network device 3 includes an ACX100 series integrated circuit 31 manufactured by Texas Instruments Incorporated, and an RF antenna 32 coupled to the ACX100 series integrated circuit 31. The interface device 2 may be formed into a USB device, an interface card, or the like, for coupling to the LAN or WLAN or network device 3.

Figure 3:
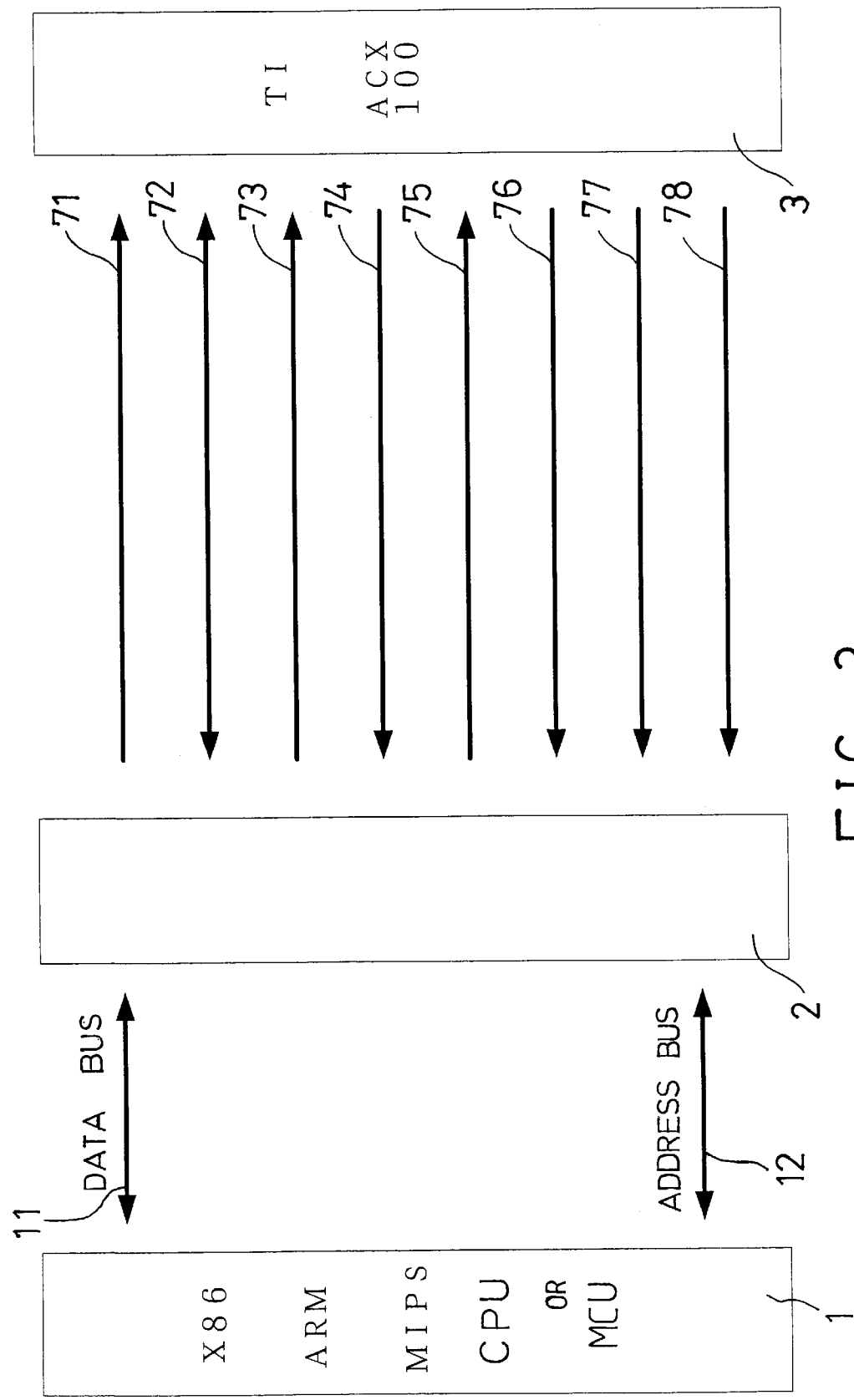
FIG. 3 is a schematic view illustrating the operation of the interface device.

As shown in FIGS. 2 and 3, the address bus 12 of the CPU or MCU 1 is coupled to the address unit 22 of the interface device 2, which is then coupled to the integrated circuit 31 of the network device 3, for allowing the address data or information to be transmitted from the interface device 2 to the network device 3, at the coupling 71 as shown in FIG. 3.

The data bus 11 of the CPU or MCU 1 is coupled to the data unit 21 of the interface device 2, which is then coupled to the integrated circuit 31 of the network device 3, for allowing the information or data to be transmitted or communicated between the interface device 2 and the network device 3, at the coupling 72 as shown in FIG. 3.

The interface device 2 includes a chip selecting unit 25 coupled to the integrated circuit 31 of the network device 3, for sending chip selecting signals to the integrated circuit 31 of the network device 3, at the coupling 73 as shown in FIG. 3, for allowing the CPU or MCU 1 to access and to process the network device 3.

The interface device 2 includes a writing control unit 26 coupled to the integrated circuit 31 of the network device 3, for allowing the integrated circuit 31 of the network device 3 to send out signals to the CPU or MCU 1 via the interface device 2, at the coupling 74 as shown in FIG. 3.

The interface device 2 includes a reading control unit 27 coupled to the integrated circuit 31 of the network device 3, for sending reading control signals to the integrated circuit 31 of the network device 3, at the coupling 75 as shown in FIG. 3, for allowing the CPU or MCU 1 to send out signals to the network device 3.

The interface device 2 includes a waiting unit 24 coupled to the integrated circuit 31 of the network device 3, for sending waiting control signals to the CPU or MCU 1, at the coupling 76 as shown in FIG. 3, and for controlling the CPU or MCU 1 in a waiting state, such as a temporary waiting state, when data or information communication between the integrated circuit 31 of the network device 3 and the CPU or MCU 1 is busy.

The interface device 2 includes a reset unit 23 coupled to the integrated circuit 31 of the network device 3, for sending resetting signals to the CPU or MCU 1, at the coupling 77 as shown in FIG. 3, and for allowing the CPU or MCU 1 to send chip selecting signals to the integrated circuit 31 of the network device 3 again, when the system has been wrongly treated or processes, and for allowing the integrated circuit 31 of the network device 3 to be suitably accessed and processed or treated by the CPU or MCU 1.

The interface device 2 includes an interrupting unit 28 coupled to the integrated circuit 31 of the network device 3, for sending interrupting signals to the CPU or MCU 1, at the coupling 78 as shown in FIG. 3, and for temporarily interrupting or switching off the CPU or MCU 1.

The chip selecting unit 25 of the interface device 2 may then send the chip selecting signals to the integrated circuit 31 of the network device 3 again, for allowing the integrated circuit 31 of the network device 3 to be suitably accessed and processed or treated by the CPU or MCU 1 again.

The CPU or MCU 1, such as the X86 series MCUs, the ARM series MCUs, or the MIPS series MCUs, may thus be suitably or compatibly coupled to the integrated circuit 31 of the network device 3 with the interface device 2.

It is to be noted that the interface device 2 may be formed into a USB device, an interface card, or the like, for coupling CPU or MCU I to the LAN or WLAN or network device 3. The interface device 2 and the CPU or MCU 1 may be easily changed to the other ones, and the integrated circuit 31 of the network device 3 may also be easily changed to the other ones, when some of the members or elements or parts are damaged.

Accordingly, the interface device in accordance with the present invention may be provided for coupling processor or microprocessor control units to network systems or facilities, and for reducing the maintenance fee for the MCUs, and the integrated circuits.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A network facility comprising:

a processor unit including a data bus and an address bus, an interface device including a data unit and an address unit coupled to said data bus and said address bus of said processor unit respectively, and a network device including an antenna, and an integrated circuit coupled to said antenna and coupled to said interface device, said interface device including a chip selecting unit coupled to said integrated circuit of said network device, for accessing to said integrated circuit of said network device, and for allowing said processor unit to send chip selecting signals to said integrated circuit of said network device, said interface device including a writing control unit coupled to said integrated circuit of said network device, for allowing said integrated circuit of said network device to send out signals to said processor unit via said interface device, and said interface device including a reading control unit coupled to said integrated circuit of said network device, for allowing said processor unit to send out signals to said integrated circuit of said network device via said interface device.

2. The interface device according to claim 1, wherein said interface device further includes a waiting unit coupled to said integrated circuit of said network device, for sending waiting control signals to said processor unit, and for controlling said processor unit in a waiting state, when data or information communication between said integrated circuit of said network device and said processor unit is busy.

3. The interface device according to claim 1, wherein said interface device further includes a reset unit coupled to said integrated circuit of said network device, for sending resetting signals to said processor unit, and for allowing said processor unit to send chip selecting signals to said integrated circuit of said network device again.

4. The interface device according to claim 1, wherein said interface device further includes an interrupting unit coupled to said integrated circuit of said network device, for sending interrupting signals to said processor unit, and for interrupting said processor unit.

* * * * *